United States Patent [19]

Jooss et al.

[11] 4,247,794
[45] Jan. 27, 1981

[54] LINEAR ACTUATOR

[75] Inventors: Karl Jooss; Richard E. Norwood, both of Boulder, Colo.

[73] Assignee: International Business Machines Corporation, Armonk, N.Y.

[21] Appl. No.: 890,880

[22] Filed: Mar. 27, 1978

[51] Int. Cl.³ .......................................... H02K 41/00
[52] U.S. Cl. ...................................... 310/13; 310/27
[58] Field of Search ................................ 310/12–19, 310/27; 340/174.1 C

[56] References Cited

U.S. PATENT DOCUMENTS

| | | | |
|---|---|---|---|
| 3,521,092 | 7/1970 | Kalthoff | 310/27 X |
| 3,577,023 | 5/1971 | Bleiman | 310/27 X |
| 3,587,075 | 6/1971 | Brown et al. | 340/174.1 C |
| 3,666,977 | 5/1972 | Helms et al. | 310/13 |
| 3,735,163 | 5/1973 | Dijkstra et al. | 310/13 |
| 3,743,870 | 7/1973 | Hunt | 310/13 |
| 3,760,206 | 9/1973 | Hertrich | 310/13 |
| 3,889,139 | 6/1975 | Hughes | 310/13 |
| 3,899,699 | 8/1975 | Griffing | 310/13 |
| 4,006,372 | 2/1977 | Brown, Jr. et al. | 310/13 |
| 4,072,101 | 2/1978 | La Garcia et al. | 310/13 X |

Primary Examiner—Donovan F. Duggan
Attorney, Agent, or Firm—James A. Pershon; Joscelyn G. Cockburn

[57] ABSTRACT

A linear motor actuator particularly adaptable to position a magnetic transducer in a magnetic disk storage system including a modular stator assembly and a modular carriage assembly. The stator assembly includes a frame with a first pair of spaced parallel guide rails; configured to have two flat guide surfaces adjacent to the carriage assembly and running in a direction parallel to the stroke of the actuator. A magnetic flux return path is integrally connected with a guide shaft and positioned between the guide rails. The carriage assembly includes a self supporting cantilevered coil positioned about the return path and guide rail, and offset from the flat surface. The carriage assembly is supported by a first set of angled ball bearings which ride on the guide shaft and a second set of spaced ball bearings which ride on the guide rails to preload the carriage assembly and prevent rotation.

A linear tachometer strip is attached to the carriage assembly and associated with a light emitting/light receiving assembly to produce electrical signals indicative of the carriage assembly position.

10 Claims, 7 Drawing Figures

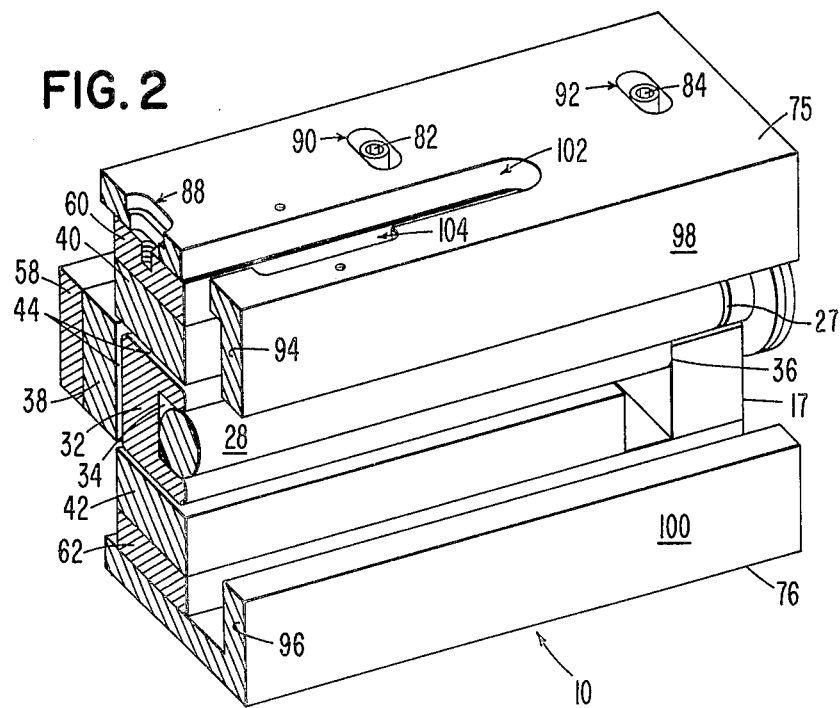
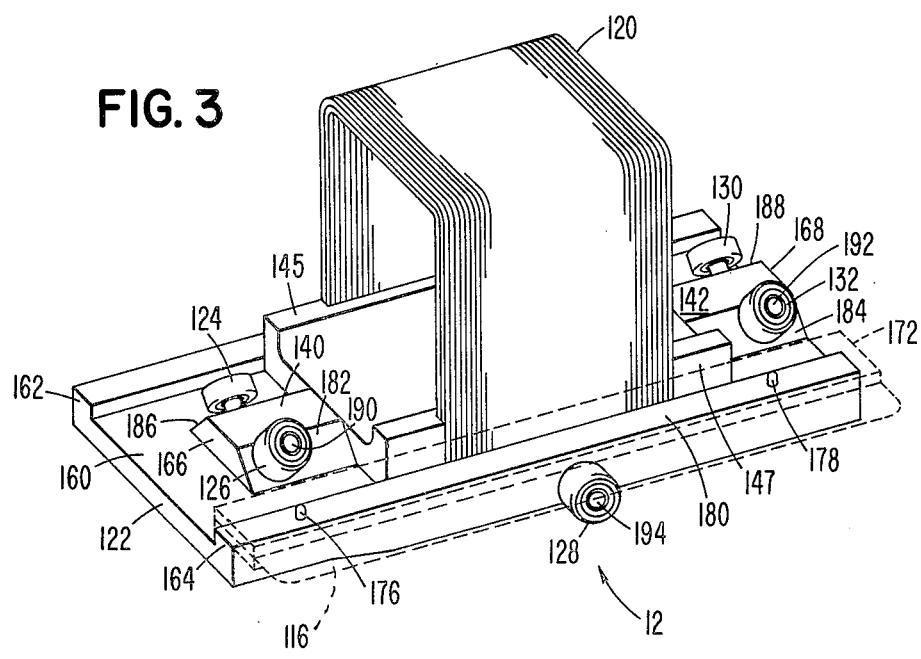

LINEAR ACTUATOR

BACKGROUND OF THE INVENTION

1. Field of the Invention

The invention relates generally to electromagnetic actuators. More particularly, the invention relates to an actuator that produces linear movement. Although not limited thereto, devices in accordance with the present invention are especially useful in positioning a magnetic transducer or print head relative to a disk in a disk memory system or the like.

2. Prior Art

The use of linear actuators or linear motors to position a transducer relative to a selected disk in a disk memory system is well known in the prior art. Prior art linear actuators consist of a frame to which a magnetic structure is attached. The magnetic structure generates a plurality of magnetic flux lines. A coil is positioned within the magnetic structure and is subjected to the magnetic flux line. As is well known in the art, by passing current through the coil, a force is created which propels the coil in its to and fro motion. Attached to the coil is a carriage assembly to which the head is attached so as to access (that is read or write) data on a selected disk in the disk pack.

In order to restrict the motion of the coil and its carriage assembly to a linear path, an elongated precision rod is mounted to the frame and relative to the magnetic structure. The precision rod is generally aligned in precise parallelism with the desired path of movement of the magnetic transducer. Sleeve bearings are used singly or in combination with other forms of sliders to propel the carriage assembly along the precision rod. Invariably the rod is supported at its two extremeties only, which result in unusual flexing of the rod as the carriage is transported to and fro. A more detailed discussion of the structure of the prior art linear actuators may be found in U.S. Pat. Nos. 3,587,075 and 3,899,699.

Although the prior art linear actuators work satisfactorily for its intended purpose, these actuators are plagued by several drawbacks. Before addressing the drawbacks of the prior art actuators, it is worthwhile noting that in order to control the accessing of data from a disk pack the carriage assembly is controlled by a servo loop. As is well known to those skilled in the art, the servo loop for a linear actuator is functional or effective over a given frequency range. The lower end of the frequency range is called the cross-over point. The frequency range in turn is related to the track density of the recorded data. The trend in present day disk storage systems is to provide high performance storage systems. High performance storage system means a storage system in which the track density is relatively high, for example, in the range of 100 tracks per inch.

Since the functional frequency range for the controlling servo loop is inter-related with data density, the higher the data density the higher is the functional frequency range for the associated controlling servo. Alternately, a storage system in which the functional frequency range of the associated servo is narrow unnecessarily restricts the data density of the system.

In view of the inter-relationship between data density and the functional frequency range of the controlling loop the optimum condition is to have a servo loop which is effective to control over a relatively wide frequency range.

One factor which adversely affects the controlling servo (which may be closed loop) of a linear actuator is the resonant frequencies of the actuator. Particularly, the resonant frequency affects the functional frequency range of the servo. The resonance in the actuator is transferred to the transducer which rides on the carriage of the actuator. Because the transducer is in the controlling servo loop, an instability is introduced into the controlling servo loop. The net result is that the servo cannot control the movable assembly so that the transducer can faithfully follow a selected track on a target disk.

Whenever the resonant frequency is relatively close to the functional frequency range of the controlling servo, a plurality of servo errors is generated. The errors adversely affect system throughput and system reliability. The resonant frequency is a direct result of mechanical vibration in the actuator. Although all actuators will vibrate at some frequency, the desirable approach is to design the actuator so that it will resonate at a relatively high frequency so that the resonant frequency of the actuator does not affect the functional frequency range of the controlling servo.

In order to maintain system reliability, if the linear actuator has a relatively low resonance frequency, then the functional frequency range for the controlling servo is invariably forced to be lower than the resonant frequency of the system. In view of the above discussion, this condition implies a low density storage disk system, an undesirable result.

Returning now to problems affecting prior art actuators, and in particular, actuators for use with flexible disk storage systems perhaps the most pressing problem is that these actuators have a relatively low natural resonant frequency; typically from 100 to 500 hertz. Due to the low resonant frequency response, the previously described defects which are associated with linear actuators having low resonant frequency response are attributes of the prior art actuators. This being the case, the prior art actuators are unsuitable for use in high density flexible disk storage systems.

One of the contributing factors for the low frequency response of the prior art actuator is the fact that the precision rod which guides the carriage assembly is susceptible to unusual flexing. As stated previously, the precision rod is only supported at its two ends with no support along its length.

Another factor stems from the fact that the slider side which rides against the precision rod creates an unusual amount of frictional resistance to motion.

Another problem which affects the prior art actuator is that the actuators do not lend themselves to modular design. One important characteristic of a modular design is that functional elements (e.g., the carriage assembly, etc.) hereafter called Field Replaceable Unit (FRU), can be changed in an actuator without interrupting the actuator's alignment with its associated disk storage system.

The non-modularity characteristic of prior art actuators stems from the fact that the design philosophy in these actuators requires the center of thrust or center of motive force (supplied by the coil) must coincide with the center of mass of the carriage assembly. This design philosophy requires a more complicated design which does not lend itself to modularity.

Associated with the non-modularity defects of the prior art is the further defect that the prior art actuators cannot be satisfactorily arranged so that a plurality of these actuators access a common disk storage system. One of the restraints which is necessary for plural accessing is that the separation be minimum between the carriage assembly, including the head arm with transducer thereon. To satisfy this restraint, it is necessary that at least one side of the actuator, preferably next to the carriage assembly and along the direction of actuator stroke, be a reference side, preferably flat. This appears to be the most auspicious method of designing the actuator so that a second actuator with a characteristic side similar to the previously described side can be placed adjacent to each other without unnecessary interference with one another. However, due to the complicated design of prior art actuators, the minimum separation requirement cannot be realized and, therefore, said actuators cannot be used for plural accessing.

Still another problem which is associated with the prior art actuators is that the coil which produces the motive force for moving the carriage assembly is not self supporting. A self supporting coil is one which does not require a bobbin to support it when it is used in a linear actuator. Almost invariably, the coil used in prior art actuators are wound on a coil supporting member generally called a bobbin. The bobbin and coil are then positioned within the air gap formed by the actuator's structure and are used to position the head assembly. Several undesirable results are associated with these coil bobbin assemblies. Firstly, the mass of the moveable assembly is increased. With more mass, more current is needed for driving the actuator. More current increases the cooling requirements and cost of the actuator. Probably more important is the fact that the bobbin tends to reduce the natural resonance frequency of the actuator and, as stated previously, adversely affects the overall operation of the actuator.

SUMMARY OF THE INVENTION

The above mentioned prior art problems are solved by the linear actuator of the present invention in which the natural resonant frequency is substantially higher than was heretofore been possible, a flat reference side which significantly minimizes the separation between the head arm when two actuators are used to access one storage file, a suspension system with lower frictional resistance than was heretofore possible for moving the carriage assembly, and a structure that can be easily removed and replaced.

In one feature of the invention the linear actuator includes an elongated stator assembly and a movable armature assembly suspended for motion within said stator assembly.

The stator assembly includes a frame having two end sections and two L-shaped side sections. Each of the end sections is attached by mounting means to one end of an integral elongated magnetic flux return path and precision guide rod combination. The spacing between the two end sections defines the stroke of the actuator. Positioned on each side of the combined flux return path and in spaced alignment therewith, is a pair of elongated permanent magnets. The magnets are connected by mounting means to the L-shaped side sections. Two spacer means are positioned between the elongated magnets and its associated L-shaped side section. The L-shaped side sections and the spacer means are connected to the end sections to form a uniform and sturdy structure. The L-shaped side sections are positioned so that one surface of the shortest dimension of the L operates as a guide rail for the carriage assembly while the other surface extends into a common plane to define a flat reference side or reference surface for the actuator. The coil assembly which propels the actuator carriage assembly is offset from the flat reference surface.

In another feature of the invention a third elongated permanent magnet is attached to a spacer means and a third side section. The combination is then mounted to the end sections of the actuator with the third elongated permanent magnet positioned in spaced alignment with the third side of the return path.

In still another feature of the invention, limiting means are mounted to the end sections of the actuator and function to stop the backward and forward motion of the armature assembly.

The armature assembly includes a head support platform movably connected to an offset self supporting coil. The coil is positioned in the space defined by the return path and elongated magnets. This space is called the air gap. The support platform is supported for motion along the precision rod and guide rails by a six ball bearing suspension system. Four of the bearings ride against the precision rod while the other two bearings preload the armature assembly so as to prevent rotation and ride against the guide rails.

In one feature of the invention one of the preload bearings is rigidly fixed to the armature assembly while the other preload bearing is mounted on a flexible member which is displaced from the support platform and creates the preloading.

In still another feature of the invention a linear tachometer strip is mounted to the armature assembly and is transported past a light emitting/light receiving source from which positional information is obtained.

In still another feature, electrical connectors are connected and operable to deliver electrical energy to the coil.

The foregoing and other features and advantages of the invention will be apparent from the following more particular description of preferred embodiments of the invention, as illustrated in the accompanying drawings.

BRIEF DESCRIPTION OF THE DRAWINGS

FIG. 2 is a section view of the linear motor actuator taken on line 2—2 of FIG. 1 and shows the stator portion of the actuator.

FIG. 3 is a view showing the armature or moving portion of the linear actuator.

FIG. 4 is a view showing the offset self support coil and the coil holder.

FIG. 5 is a view showing two actuators arranged to access a single disk storage system.

FIG. 6 is a section across the linear actuator showing the movable assembly with the ball bearing suspension systems. The section shows the inter-relation between the stator assembly and the armature assembly of the actuator.

FIG. 7 is a prospective view of an alternate embodiment of a linear actuator according to the present invention.

DETAILED DESCRIPTION OF THE PREFERRED EMBODIMENT

Figure 1:
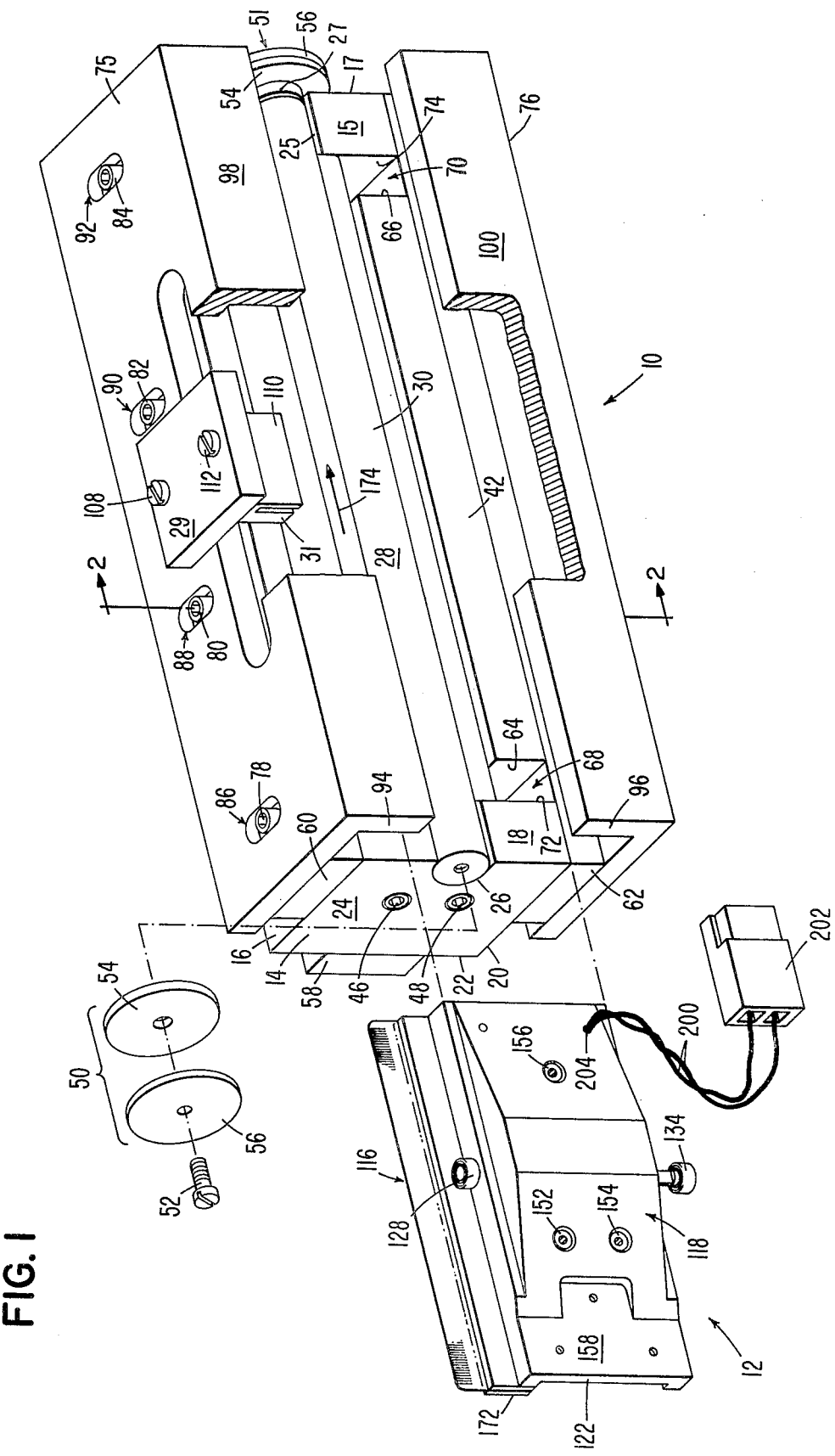
FIG. 1 is a perspective view of a linear actuator construction embodying the present invention.

Referring now to the drawings, the preferred embodiment of the Linear Actuator or Linear Motor is shown in FIG. 1. The linear actuator comprises two basic parts: an elongated stator assembly 10 (FIGS. 1 and 2) and a movable armature assembly 12 (shown in FIGS. 1 and 3). The armature assembly is slideably movable along the length of and relative to the stator assembly 10. In order to simplify the detailed description of the linear actuator, like members in the drawings will be identified by common numeral.

Referring now to FIGS. 1 and 2, the elongated stator assembly 10 includes two end plates, 14 and 17 respectively, only one of which is shown completely in the drawings and identified as end plate 14. Since the other end plate 17 is substantially identical to end plate 14, the described characteristics of end plate 14 should be attributed to the other end plate 17. End plate 14 has a substantially rectangular shape with four sides, 16, 18, 20 and 22 respectively. The end plate has two surfaces, only one of which is shown in the drawings and identified as 24. The other surface is opposite to surface 24. The two end plates are positioned in space alignment so that at least one of the flat surfaces faces the other. The distance between the flat surfaces of the end plates define the stroke of the linear actuator. Although it is within the skill of the art to use the teaching disclosed herein and design actuators having various strokes without departing from the spirit and scope of this invention, in the preferred embodiment of this invention the stroke of the actuator is approximately four inches. Stated another way, the effective distance beteen the facing surfaces of the two end plates are substantially equivalent to six inches. Semi-circular notches 26 and 25 respectively, are machined into sides 18 and 15 of the end plates. An elongated rod 28 is seated in the semi-circular notch. A notched detent 27, hereinafter called latching means, is fabricated on the precision rod. The latching means co-acts with the ball bearing to lock the carriage assembly. Stated another way, when current is not applied to the bobbinless offset coil 120, a pair of the ball bearing suspension rests within the latching means. The coaction between the ball bearings and the latching means prevents the carriage assembly from moving. The carriage remains in the rest position until current is applied to the coil.

In addition to the latching function, the latching means identifies the beginning of the stroke of the actuator. The rod is seated in the semi-circular notch so that one of its curved surfaces, 30, protrudes slightly above sides 18 and 15 respectively. The rod need not be completely circular. It may be a semi-circle, flat or other geometric shape. However, in the preferred embodiment of the invention the surface which protrudes above sides 18 and 15 respectively is curved and smooth. As will be explained subsequently, the elongated rod 28 operates to restrict the motion of the movable armature assembly in a linear path. In the preferred embodiment of the present invention, the elongated rod is fabricated from a nonmagnetic material, preferably stainless steel, with a smooth finish on curved surface 30. With a smooth surface finish, the frictional resistance which is offered to the rolling mechanism riding on the curved surface is minimal. Also, by using nonmagnetic material to fabricate the guide rod contamination, due to magnetically attracted particles, is reduced.

Referring to FIG. 2 for a moment, the stator assembly further includes an elongated bar 32. A channel 34 is fabricated within the elongated bar. The elongated bar is then securely attached along the elongated channel to elongated rod 28. The two ends of the elongated bar, only one of which is shown in the figure and identified as end 36, are rigidly attached to the facing surface of end plates 14 and 17 respectively. The attached elongated bar serves two purposes. Firstly, the bar serves as a continuous support and minimizes flexing of the elongated rod. By reducing the flexing the resonance frequency of the actuator is increased. Stated another way, by supporting the elongated bar along the entire length increases the stiffness of the bar and hence increases the natural frequency at which the actuator resonates. Secondly, the bar acts as the magnetic flux return path of the magnetic circuit of the actuator. In order for the bar to operate as a magnetic flux return path, it is manufactured from a ferro-magnetic material with relatively high flux passing characteristics, for example, soft iron. A thin layer or film of copper is plated onto the surface of the elongated bar. The layer is referred to in the art as a shorted turn. The layer of copper allows for a quicker current rise in the coil. The result is that the response characteristic of the actuator is improved. It is worthwhile noting that although one means for supporting the elongated rod is disclosed herein, it is within the skill of the art to fabricate other types of support means extending along the length of the elongated rod without departing from the scope of the present invention.

Still referring to FIG. 2, magnetic flux generating means 38, 40 and 42 are positioned in proximity to elongated bar 32. In the preferred embodiment of this invention the flux generating means are a plurality of elongated rectangular slab magnets. The magnets are positioned in spaced relationship with the elongated bar 32 so as to define air gap 44 between the bar magnets and the elongated bar 32. As will be explained subsequently, a coil assembly is positioned within the air gap. By supplying current to the coil and the coil co-acting with the flux line generated from the elongated magnets a force is created which propels the armature assembly between end plates 14 and 17 of the linear actuator.

Referring again to FIG. 1 for the moment, end plate 14 is fastened to one end of elongated bar 32 (FIG. 2) by fastening means 46 and 48 respectively. A similar pair of fastening means (not shown) attaches end plate 17 to the other end of the elongated bar. In the preferred embodiment of this invention screws are used as the fastening means. By torquing the screws in a clockwise direction, the end plates are securely attached to the elongated bar and by torquing the screws in a counterclockwise direction the end plates are loosened and allow the end plates to be removed from the elongated bar.

From the above description it can be seen that the magnetic structure circuit for the actuator includes the flux generating means 38, 40 and 42, the end plates 14 and 17, the spacer means 58, 60, and 62 and possibly the L-shaped side plates 75 and 76.

In order to stop the movable armature assembly, stopping means 50 is securely attached by fastening means 52 to one end of elongated rod 28. A similar stopping means 51 is attached to the other end of rod 28. Of course, the stopping means may be attached to the end plates. The stopping means is so positioned that it extends slightly above curved surface 30. As will be explained subsequently, as the armature assembly traverses the elongated rod in a to and fro motion, a protruding notch on the bottom surface of armature assembly coacts with the stopping means to stop the movable assembly at the end or beginning of the stroke of the actuator. In the preferred embodiment of this invention, the stopping means is fabricated from a laminate comprised of a resilient member, for example, hard rubber 54 and a relatively hard backing member, for example, steel backing 56. The stopping means is mounted so that the hard rubber portion interfaces the steel backing and the end plates or elongated rod. By mounting the stopping means in this manner the hard rubber acts as a shock absorber when the movable assembly hits the stopping means. In the preferred embodiment of this invention, a hole is bored in the laminated stopping means and the end plate and a screw is used for mounting the stopping means.

Referring again to FIGS. 1 and 2, the flux generating means 38, 40 and 42 are mounted to the elongated spacer means 58, 60 and 62 respectively. In the preferred embodiment of this invention, the spacer means are elongated rectangular pieces of magnetic material, for example, steel. Since the relationship between the flux generating means and the elongated spacer means are the same for each laminate, only one of these laminates, for example flux generating means 42 and elongated spacer means 62, will be described.

In FIG. 1 elongated spacer means 62 is attached at its two ends to end plates 14 and 17 respectively. Flux generating means 42 (FIG. 2) is shorter than the elongated spacer means and is fitted against the central section of the spacer means so that the ends 64 and 66, respectively, do not align with the end of the spacer means. Stated another way, a space or void 68 and 70 respectively exist around the end of elongated bar 32 (FIG. 2) between surfaces 72 and 74, respectively, of the end plates and the ends of the flux generating means 38, 40 and 42 respectively. As will be explained subsequently, the stopping means stops the movable assembly so that the coil aligns with the ends of the flux generating source when the movable assembly is stopped by either of the two stopping means.

Still referring to FIGS. 1 and 2, side plates 75 and 76, respectively, are attached via a plurality of fastening means 78, 80, 82 and 84 respectively to spacer means 60. A plurality of similar fastening means (not shown) are used to attach side plate 76. As is evident from the drawings, side plate 75 and side plates 76 are identical and, therefore, only side plate 75 will be discussed in detail. The side plate is machined from a common piece of metal into a L shaped member. A plurality of recessed holes 86, 88, 90 and 92, respectively, are machined along the sides of the member. The holes may be positioned so that recess hole 78 and 84 aligns with the end plates. With this alignment, when screws 78 and 84 are fitted into holes 86 and 92 respectively, the side plate is securely fastened to the end plates to form a unified structure. In FIG. 1 holes 78 and 84 do align with the end plates. The inner recess surface of recess holes 86, 88, 90 and 92 fits against the under surface of screw heads 78, 80, 82 and 84 respectively and binds the side plates into a unified structure. A similar set of holes and screws are machined into side plate 76 and are operable to bond side plates 76 into the end plates and spacer means 62 (FIG. 2).

The L shaped members 75 and 76 respectively are mounted to the end plates of the actuator so that flat surfaces 98 and 100 respectively which are positioned on the small sides of the L shaped members 75 and 76, respectively, extend into a common plane beyond curve surface 30 at elongated rod 28. Stated another way, the L shaped side members are mounted to the sides of the end plate so as to be symmetrical to the elongated rod 28. The sides having the shortest dimension of the L shaped members 75 and 76, respectively, project into a common plane which is equidistance from the curved surface 30 along the length of the elongated rod 28. As will be explained subsequently, the sides of the L shaped side members having the shortest dimension herein referred to as rails 94 and 96 operates with the curved surface of the elongated rod to form a linear track along which the movable armature assembly suspended on a plurality of ball bearings is propelled.

Still referring to FIGS. 1 and 2, elongated hole 102, with stepped central portion 104 (FIG. 2) is machined into the side of side plate 75. If desired, a similar hole can be fabricated into side plate 76. Since both holes are positioned in the same manner and serve the same function, only hole 102 will be described. The hole 102 is so positioned that it aligns with the space generated between guide rails 94 and 96, respectively, and curved surface 30 on the guide rod.

A light receiving means (not shown) is attached to side 31 of holder assembly 29. The light receiving means may be a photosensitive transistor. The holder assembly is mounted via fastening means 108 and 112 to the side plate. Likewise, a light emitting means (not shown) is mounted to side 110. The light emitting means may be a light emitting diode (LED). The light emitting means is positioned in optical alignment with the light receiving means. The alignment between the light emitting and light receiving means is such that the beam which is radiated from the light emitting source falls on the light receiving means. However, when linear tachometer strip 116 on which a plurality of light and dark windows are positioned passes between the light receiving and light emitting source, a plurality of pulses are outputted which can be used to servo control the movable assembly. Since the use of an optical disk is well known in the art, a detailed description of the strip and its interaction with the light emitting/light receiving package will not be described any further.

Referring now to FIGS. 1, 3 and 4, movable armature assembly 12 is shown. In FIG. 1 top surface 118 of the carriage assembly is shown while in FIG. 3 the underside of the actuator which interfaces curved surface 30 when the actuator is assembled is shown. As was stated previously, the function of the movable armature assembly is to position a head/arm (not shown) which supports a magnetic transducer (not shown) relative to a selected disk within a disk pack. The movable armature assembly includes bobbinless coil 120, head support platform 122 and a suspension system which includes ball bearings 124, 126, 128, 130, 132 and 134.

The coil in conventional actuators is wound on a bobbin and the bobbin and coil become part of the final assembly of the actuator. In contradistinction to the prior art coil assembly, the coil 120 which is used in the actuator, according to the present invention, does not have a bobbin. The term bobbinless coil, when used in this application, means that the coil is self supporting and does not require a bobbin when placed in the actuator according to the present invention. The coil may be formed in any desired cross section, for example, triangular, circular, etc. In the preferred embodiment of this invention, the coil is formed into a rectangular cross section. Not withstanding, the cross sectional configuration of the coil, it is necessary that the coil be designed with at least one straight side. As will be explained subsequently, the plane which is defined by the straight side attaches the coil to the head support platform so that the coil is cantilevered or offset from the straight side or the head support platform. Due to the cantilevered manner of attaching the coil to the head support platform, two of the actuators can be arranged in a back-to-back manner for dual accessing of a disk pack. Among the beneficial results which eminate from the cantilevered attaching of the coil to the head support platform is that the center of force which is generated by the coil for driving the head support platform and its attachment, for example, the head/arm and magnetic transducer, is offset from the center of mass of the head support platform. This allows for a modular design and, of course, the previously mentioned back-to-back attachment of dual actuators.

Referring now to FIGS. 3 and 4, coil 120 is attached to coil holder 136. Although a plurality of coil holders may be used in the preferred embodiment of this invention, the coil holder is fabricated from a relatively light weight non magnetic material with a flat surface 138 and two raised rectangular end sections 145 and 147 respectively. Each of the raised rectangular end sections has a flat surface which projects into a common plane above flat surface 138. Channel 144 is fabricated on the underside of the coil holder. In fabricating the coil, the channel is fitted over a mandrel or some other coil form (not shown). The coil is then wound over the holder and mandrel. The coil is then saturated with epoxy. The mandrel is then withdrawn and the coil itself is a structural member affording self support. It is worthwhile noting that although a particular method is disclosed for fabricating the coil, it is within the skill of the art to devise other methods without departing from the scope of the invention.

An alternative way of fabricating the coil is to wind the coil on the mandrel, saturate the coil with epoxy or some other material and then attach the coil to a coil holder. The coil holder, with the offset or cantilevered coil, is then fastened at the flat surface to head support platform 122. In the preferred embodiment of this invention, receiving holes 146, 148 and 150 are drilled into the raised end sections 145 and 147 of the coil holder. Mounting screws 152, 154, and 156 (FIG. 1) are used to attach the coil holder to the head support means.

In FIG. 1 the head support platform, as viewed from the top surface 118, is shown removed from the fixed section (that is the stator) of the actuator. In FIG. 3 the undersurface of the head support platform is shown. With reference to FIGS. 1 and 3, the head support platform is fabricated from a substantially elongated member. The top surface 118 of the head support platform is in the shape of a truncated cone with T shaped surface 158 machined in one of the sloping surfaces of the cone. The T shaped surface is used for attaching a head arm (not shown) to the head support platform. The underside of the head support platform shown in FIG. 3 is substantially U shaped with base 160 and sides 162 to 164 respectively. Ball bearings support means 166 and 168 are fabricated on base 160 of the head support platform. The ball bearing support means are positioned at each end of the head support platform and project above the base of said platform. The ball bearing support means are fabricated towards the center of the base of the head support platform. The ball bearing support means are positioned in spaced alignment and are separated by a predetermined distance taken along the length of the head support platform. The distance is equivalent to the length of the coil holder measured in a direction along arrow 170 (FIG. 4). With this relationship as shown in FIG. 3, the raised end portion 145 and 147 of the coil holder fits snugly against ball bearing support means 166 and 168 respectively.

Still referring to FIGS. 1 and 3, strip holder 172 is fastened to sides 164 of the head support platform. As was stated previously, linear tachometer strip 116 is mounted to the strip holder. As the head supported platform is transported in a path parallel to arrow 174, it intercepts the light beam between the light emitting source and the light receiving source and, as a result, controlled pulses are outputted. The pulses are used for servoing (that is to position the head relative to a track on a selected disk). Although a plurality of means may be used for mounting the strip holder to the head support platform, in the preferred embodiment of this invention a plurality of pins, for example, 176 and 178, are fabricated on surface 180 on side 172. The pins are positioned so as to project above surface 180. The strip holder is then attached to the pins.

The ball bearing support means are further characterized by a truncated trapezoidal shape. The sloping sides of the trapezoid (for example, sides 182, 184, 186 and 188) are inclined (that is angled) to base 160 while flat surfaces 140 and 142, respectively, interface the curved surface 30. It is worthwhile noting that base 160 is parallel to a plane which runs on the apex of curved surface 30. This being the case, and as will be explained subsequently, the ball bearings which ride against curved surface 30 are at an angle to said surface. Stated another way, the ball bearings are angled relative to elongated rod 28. Four pins are rigidly mounted to the four sloping sides of the ball bearing support means, respectively. In FIG. 3, two of the rigidly mounting pins 190 and 192, respectively, are shown. Four of the ball bearings are mounted to the mounting pins.

Referring now to FIGS. 3 and 6, the suspension system which propels the movable assembly of the tachometer along curved surface 30 and guide rails 94 and 96 are shown relative to the stator of the actuator. In normal operation, the movable assembly travels in a linear path perpendicular to the plane of the paper. As was stated previously, the suspension includes six ball bearings. Four of the ball bearings, 124, 126, 130 and 132, respectively, are mounted via rigid mounting pins to ball bearing support means 166 and 168 respectively. The four ball bearings are angled to the curved surface of the elongated rod 28 and rides against said surface. Ball bearings 128 and 134 ride against rails 94 and 96 respectively, and prevent the movable assembly from rotational movement. Stated another way, the movable assembly of the actuator is preloaded against rail 94 and 96 by ball bearing 128 and 134, respectively. Ball bearing 128 is mounted to side 164 of the head support platform by a rigid pin 194. Ball bearing 134 is mounted on flexible member 198, hereinafter called cantilever beam 198. The cantilever beam is fastened into side 162 of the head support platform, in spaced alignment with steel pin 194 and ball bearing 128. The preloading of the carriage assembly is achieved by the cantilevered beam and ball bearing 134. The pre-load bearing is positioned just about the mid point of the elongated head support form.

Current to coil 120 is supplied by electrical conductor 200 (FIG. 1). The conductor is connected to terminal 202. Hole 204 is fabricated in the head support platform and the conductors are threaded through said hole to attach to the coil. This completes the description of the movable assembly.

As was stated previously, by designing the coil to have at least one flat surface which is mounted to the carriage assembly and by designing the side plates so that the actuator has at least one flat surface displaced from the plane of the precision rod, two of the actuators designed according to the above teaching can be mounted in a back-to-back fashion to access data from a common disk pack. In FIG. 5 a configuration which allows for back-to-back operation of two transducers is shown. As was stated previously, one requirement is that the separation distance 206 be minimum so that the head/arms 208 and 210 can be relatively close. In FIG. 5, actuator 212 and actuator 214 are mounted on a support means 216. Mounted to the carriage assemblies are head/arms 208 and 210. Magnetic transducers 222 and 224 are attached to the head/arms. Magnetic storage system 226 is positioned on support means 228 in alignment with the actuators. The magnetic storage system includes backing plates 230 and 232 respectively. Separator means 234 divides the storage system into two compartments. Each compartment has a plurality of disks and are aligned so that either of the two magnetic transducers can access a selected track on a selected disk as the magnetic storage system rotates about an axis parallel to line 236. By designing a system using two actuators, the reliability, availability and service-ability of the overall system is improved. This is so because if one of the actuators is defective then data can still be obtained from the storage system with the non defective transducer.

Referring now to FIG. 7, an alternate embodiment of a linear actuator, according to the teaching of the present invention, is shown. The linear actuator includes an elongated stator assembly 302 and a movable assembly 304. The movable assembly coacts with the stator assembly in a conventional manner to effectuate to and fro motion.

The stator assembly includes a frame, 306, fabricated from a U-shaped member. The frame is fabricated from a casting. End plate 308 is fastened at the open side of the U-shaped member by fastening means 310. An elongated magnetic structure, including a plurality of elongated magnets (not shown) but substantially similar to the magnetic structure previously described, is connected to the inner surfaces of the frame. Precision rod 28 is fitted to elongated bar 32 and the assembly, (i.e., the elongated bar and the precision rod) is mounted to the frame in spaced alignment with the permanent magnets. The assembly functions as a flux return path to return flux generated by the permanent magnets. The relationship between the permanent magnets and the flux return path is such that an air gap (not shown) is defined therebetween. Stop crash means 312 is mounted to the frame and functions to limit the stroke of the actuator in its to and fro motion.

Still referring to FIG. 7, guide rails 314 and 316, respectively, are attached to the frame. As was explained previously, two of the ball bearings (only one of which is shown in the figure and is identified as element 318) which forms the suspension mechanism for the movable assembly roll against the rails and prevents the movable assembly from rotating. Guide rail 316 is attached to the frame by fastening means 320 and 322. A light emitting/light receiving assembly 324 is mounted to the frame. The assembly 324 is fitted with a slot through which linear tachometer strip 326 is transported. Guide rail 314 is resiliently attached to the frame. By resiliently attaching the guide rail to the frame, the anti-rotational characteristic of the assembly which is achieved by the coaction between the guide rails and the rolling ball bearings is enhanced.

Although it is within the skill of the art to devise a plurality of ways for resiliently attaching guide rail 314 to the frame in the preferred embodiment of this invention, the rail is spring loaded relative to the frame. Guide rail 314 is attached at both ends to support members 328 and 330 respectively. The support members are mounted to the frame so that the guide rail is offset relative to one of the long sides of the U-shaped frame. A pair of holes, 332 and 334, respectively, are bored into the guide rails. A pair of thread screws, 336 and 338, are fitted with cylindrical springs 340 and 342 respectively. The combination (i.e., spring and screw), is fitted into holes 332 and 334 respectively. The fact that the rail is cantilevered relative to the frame and the fact that the screws are spring loaded creates the preload for the carriage assembly. By torquing the screws, the preload on the carriage assembly is adjustable.

Still referring to FIG. 7, the movable assembly includes a support platform 344. Coil assembly 346 is wound onto the platform. The coil assembly is cantilevered from the support platform into the air gap defined by the permanent magnets and the flux return path. The platform and coil assembly is supported by a ball bearing suspension system. The suspension system includes six ball bearings. Four of the six ball bearings are substantially similar to those previously described. The four ball bearings are mounted to the support platform in groups of two, which are arranged at an angle relative to the precision rod 28. The other two ball bearings are mounted to the support platform and prevent the assembly from rotating. Since the two ball bearings, which limit rotation of the assembly are identical, only one of said ball bearings identified as element 318 will be described. A pin, 348, is fitted to the support platform and the ball bearing is mounted on the pin. The ball bearing then rolls against rail 314 to preload the assembly. Linear tachometer strip 326 is fitted to the carriage and is transported therewith.

OPERATION

When the linear actuator, according to the present invention, is assembled, for example as shown in FIG. 6, the permanent magnets 38, 40 and 42 radiate magnetic flux which crosses the air gap between elongated bar 32 and the magnets through coil 120 and into the elongated bar. The magnetic flux then exits the bar at its two ends then travels to end plates 14 and 15 respectively through the spacer means and back into the permanent magnet to complete the closed magnetic loop. In the meantime, electrical current is supplied via terminal 202 through conductor 200 to the coil. The interaction between the magnetic field created by the permanent magnets and the field created by the current carrying coil generates a force which propels the movable assembly along its linear path defined by elongated rod 28 and guide rails 94 and 96 respectively. Stopping means 50 interacts with ball bearing support means 166 and 168 respectively to stop the movable assembly at the end of the actuator stroke.

When a linear actuator is fabricated in accordance with the teaching disclosed herein, the following advantages are observed:

The physical arrangement allows for back to back operation of two actuators in close proximity. This allows two actuators to access a single disk file simultaneously.

The natural frequency at which the actuator resonates is relatively high.

The fact that the coil assembly is offset or cantilevered allows for the head-arm-carriage assembly to be easily removed for servicing while maintaining the alignment of the actuator with a disk file storage system.

While the invention has been particularly shown and described with reference to the preferred embodiments thereof, it will be understood by those skilled in the art the various changes in form and detail in addition and/or subtraction to various embodiments specifically mentioned herein, may be made without departing from the spirit and scope of the invention.

What is claimed is:

1. In a direct access storage system including one or more data storage disks mounted for rotation about a common axis, a linear actuator positioning a transducer relative to a data track on a selected one of said disks, said linear actuator comprising in combination:
   a pair of end plates mounted in spaced alignment;
   a channel-shaped elongated member fastened between said end plates;
   an elongated precision rod supported along its length within the channel of said member and defining the stroke of the linear actuator;
   at least one elongated bar-shaped permanent magnet placed adjacent said channel member and defining an air gap between said bar magnet and said channel member at a side of said channel member other than that defining the channel;
   L-shaped guide rails, one placed in spaced relationship alongside of said rod and at least partially encompassing said rod;
   a platform used to support the transducer;
   a bearing suspension means supporting said platform in operable suspension along the stroke of the linear actuator defined by said rod and said guide rails; and
   a self-supporting electromagnet coil fastened at one side of its conductors to said platform and extending from said platform to surround said rod and channel member combination in the magnetic air gap defined by said bar permanent magnet; and
   means for supplying electrical current to said coil.

2. A linear actuator including an elongated stator assembly and a movable armature assembly, said stator assembly comprising in combination:
   an elongated bar unit having a semicircular face at one side along its length, said unit operable as a magnetic flux return member;
   at least one elongated bar-shaped permanent magnet defining a magnetic air gap with said elongated bar unit; and
   L-shaped elongated guide rails defining an at least partially enclosed channel around said semicircular portion of said assembly; and
   wherein said movable armature assembly comprises in combination:
   a platform having a bearing suspension system connected thereto for contacting said semicircular section of said bar unit and the walls of the enclosed channel defined by said guide rails; and
   a self-supporting electromagnet coil having one side of its conductors fastened to said platform and cantilevered therefrom to project into the magnetic air gap and surrounding said elongated bar unit; and
   means for supplying electrical energy to said coil.

3. A linear actuator as defined by claim 2 wherein said elongated bar unit comprises a channel-shaped member with an elongated circular rod supported along its length within the channel of said member.

4. The device as claimed in claim 3 where the bearing suspension system includes:
   two pairs of angled ball bearings, positioned in spaced relationship with one another and operable to ride on the semicircular face of the elongated bar unit; and
   a pair of non-angled ball bearings positioned in spaced relationship within the channel in contact with said L-shaped guide rails and operable to prevent rotation.

5. The device claimed in claim 4 wherein one of the non-angled ball bearings is connected to the support platform by a flexible member, and the other non-angled ball bearing is attached to the platform by a rigid member.

6. The device as claimed in claim 2 further including stopping means connected to the frame and operable to stop the linear motion of the support platform at the limit ends thereof.

7. The device claimed in claim 6 wherein the stopping means includes a shock absorbing member.

8. The device as claimed in claim 2 further including a linear tachometer strip.

9. A linear actuator comprising in combination:
   a stator assembly including:
   first and second end plates positioned in spaced relationship;
   an elongated channel-shaped member supported between said end plates;
   an elongated circular guide rod mounted in the channel of said member;
   a pair of L-shaped guide rails connected to the end plates, said guide rails being positioned to form an at-least partially enclosed channel around said guide rod to define the linear path for said movable assembly with said angled bearings riding on said guide rod and said non-angled bearings riding on said guide rails; and
   elongated magnetic flux generating means connected to the side members and positioned about the elongated support means and operable to define an air gap therebetween; and
   a movable assembly for said stator assembly including:
   a platform;
   a suspension system connected to the platform and operable to transport said platform along a linear path defined by the stator said suspension system including angled bearings connected to the underside of the support platform, and non-angled bearings connected to the sides of the platform;
   a self-supporting electromagnetic coil having a portion of its conductors connected to the platform and cantilevered therefrom, said coil operable for surrounding a platform support of the stator that supports said platform through said angled bearings and provides a return path for the magnetic flux generated by the stator; and
   means for providing an electrical current to said coil.

10. The device claimed in claim 9 further including a spacer means rigidly mounted between the flux generating means and the side members and operable to adjust the air gap.